United States Patent
Watts et al.

(10) Patent No.: US 12,117,393 B2
(45) Date of Patent: Oct. 15, 2024

(54) METHODS, APPARATUSES, AND SYSTEMS FOR DIAGNOSING MISALIGNMENT IN GAS DETECTING DEVICES

(71) Applicant: Honeywell International Inc., Charlotte, NC (US)

(72) Inventors: Rodney Royston Watts, Dorset (GB); Antony Leighton Phillips, Dorset (GB); Peter Mark Harrie, Monmouthshire (GB)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 18/311,146

(22) Filed: May 2, 2023

(65) Prior Publication Data

US 2023/0266238 A1   Aug. 24, 2023

Related U.S. Application Data

(62) Division of application No. 16/858,291, filed on Apr. 24, 2020, now Pat. No. 11,674,894.

(51) Int. Cl.
| | | |
|---|---|---|
| *G01N 21/3504* | (2014.01) | |
| *G01N 21/31* | (2006.01) | |
| *G01N 21/61* | (2006.01) | |

(52) U.S. Cl.
CPC .   *G01N 21/3504* (2013.01); *G01N 2021/3166* (2013.01); *G01N 21/61* (2013.01)

(58) Field of Classification Search
None
See application file for complete search history.

(56) References Cited

U.S. PATENT DOCUMENTS

| | | | |
|---|---|---|---|
| 9,207,170 | B2 | 12/2015 | Tröllsch |
| 10,620,045 | B2 | 4/2020 | Feitisch et al. |
| 2012/0307241 | A1 | 12/2012 | Maity et al. |
| 2015/0041660 | A1 | 2/2015 | Trollsch |
| 2015/0326313 | A1 | 11/2015 | Brouillet |
| 2019/0101840 | A1 | 4/2019 | Van Der Post |

OTHER PUBLICATIONS

Communication about intention to grant a European patent Mailed on Mar. 16, 2023 for EP Application No. 21167949.
European search report Mailed on Sep. 3, 2021 for EP Application No. 21167949, 9 page(s).
Final Office Action Mailed on Nov. 22, 2022 for U.S. Appl. No. 16/858,291.
Non-Final Office Action received for U.S. Appl. No. 16/858,291, mailed on Mar. 31, 2022, 6 pages.
Notice of Allowance and Fees Due (PTOL-85) Mailed on Feb. 2, 2023 for U.S. Appl. No. 16/858,291.
Requirement for Restriction/Election received for U.S. Appl. No. 16/858,291, mailed on Aug. 23, 2021, 5 pages.

*Primary Examiner* — Edwin C Gunberg
(74) *Attorney, Agent, or Firm* — Alston & Bird LLP

(57) ABSTRACT

Methods, apparatuses, and systems for diagnosing misalignment in gas detecting devices are provided. An example method may include causing at least one detector component of a receiver element of the open path gas detecting device to generate a first light intensity indication corresponding to first infrared light; causing the at least one detector component to generate a second light intensity indication corresponding to second infrared light; and generating an alignment indication based at least in part on the first light intensity indication and the second light intensity indication.

20 Claims, 9 Drawing Sheets

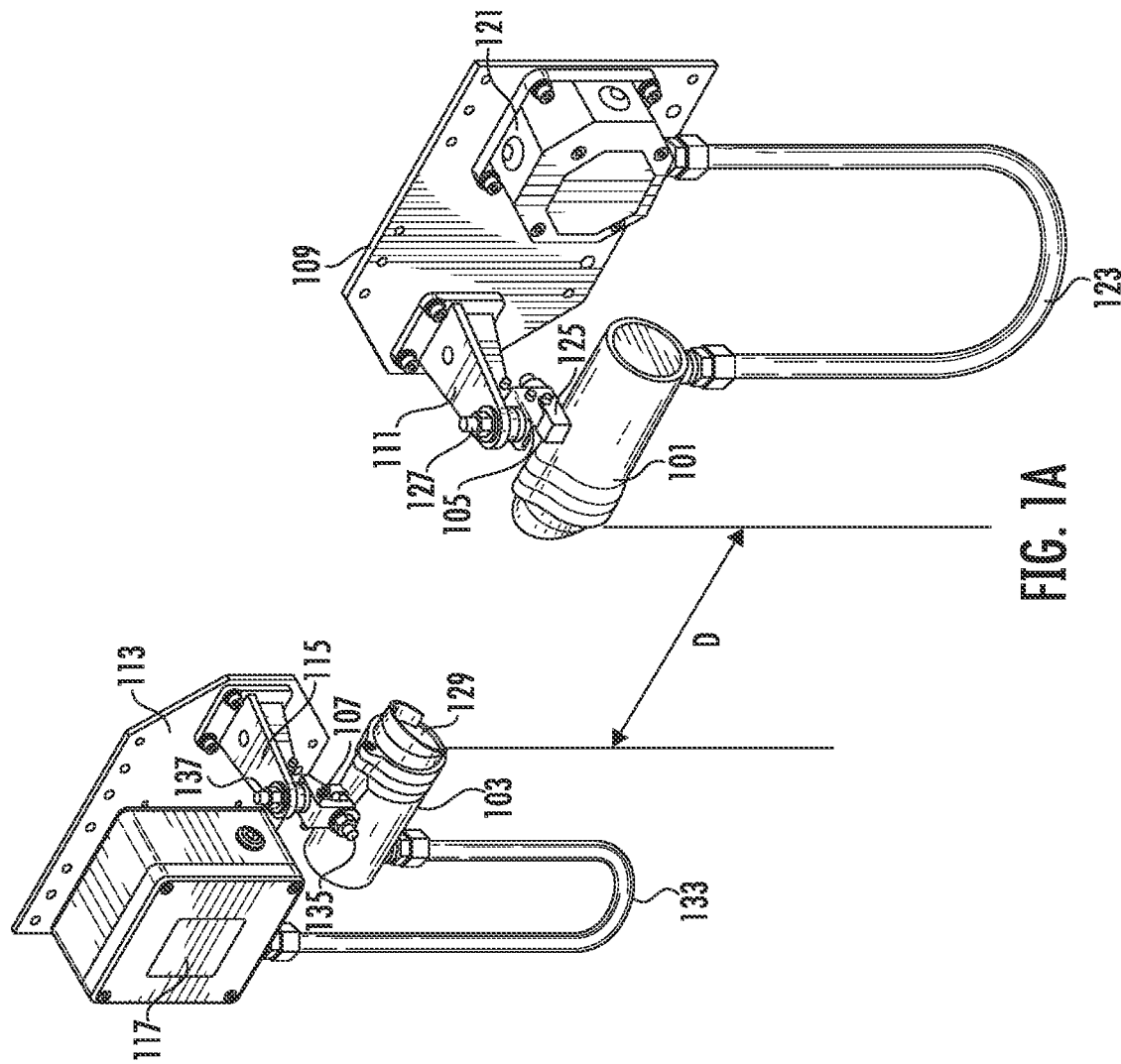

METHODS, APPARATUSES, AND SYSTEMS FOR DIAGNOSING MISALIGNMENT IN GAS DETECTING DEVICES

CROSS-REFERENCE TO RELATED APPLICATIONS

This patent application is a divisional of U.S. patent application Ser. No. 16/858,291, filed Apr. 24, 2020, which is incorporated herein by reference in its entirety.

BACKGROUND

A gas detecting device (or a gas detector) refers to an apparatus that may detect, measure, and/or identify one or more gaseous substances in an environment. For example, a gas detecting device may detect a concentration level of a gaseous substance (also referred to as "target gaseous substance") in an area. A gas detecting device may be part of a safety system. When the concentration level of hazardous or harmful gaseous substance detected by the gas detecting device exceeds a threshold, the safety system may generate a notification (for example, an alarm) to operator(s) of the safety system, so that the operator(s) may carry out one or more remedial actions (for example, shutting down the source of the gaseous substance, leaving the area, etc.).

BRIEF SUMMARY

In accordance with various examples of the present disclosure, an example gas detecting device may be provided. In some examples, the example gas detecting device may comprise a transmitter element, a receiver element, and a microcontroller.

In some examples, the transmitter element may comprise an infrared light source component configured to generate infrared light. In some examples, the receiver element may comprise at least one detector component configured to generate a light intensity indication corresponding to the infrared light. In some examples, the microcontroller may be electronically coupled to the transmitter element and the receiver element.

In some examples, the microcontroller may be configured to generate an alignment indication based at least in part on a first light intensity indication corresponding to first infrared light and a second light intensity indication corresponding to second infrared light. In some examples, the alignment indication may indicate whether the transmitter element is misaligned.

In some examples, the microcontroller may be configured to: cause the infrared light source component to generate the first infrared light triggered at a first discharge energy level; cause the at least one detector component to generate the first light intensity indication corresponding to the first infrared light; cause the infrared light source component to generate the second infrared light triggered at a second discharge energy level; and cause the at least one detector component to generate the second light intensity indication corresponding to the second infrared light.

In some examples, the transmitter element may comprise a power source component electronically coupled to the infrared light source component. In some examples, when causing the infrared light source component to generate the first infrared light, the microcontroller may be configured to cause the power source component to supply a first voltage level power to the infrared light source component. In some examples, when causing the infrared light source component to generate the second infrared light, the microcontroller may be configured to cause the power source component to supply a second voltage level power to the infrared light source component.

In some examples, the first light intensity indication may indicate a first intensity level of the first infrared light received by the receiver element. In some examples, the second light intensity indication may indicate a second intensity level of the second infrared light received by the receiver element.

In some examples, the microcontroller may be further configured to: calculate a ratio value based on the first light intensity indication and the second light intensity indication; and determine whether the ratio value satisfies a predetermined threshold.

In some examples, the microcontroller may be further configured to: in response to determining that the ratio value satisfies the predetermined threshold, generate the alignment indication to indicate that the transmitter element is not misaligned to the receiver element.

In some examples, the microcontroller may be further configured to: in response to determining that the ratio value does not satisfy the predetermined threshold, generate the alignment indication to indicate that the transmitter element is misaligned to the receiver element.

In accordance with various examples of the present disclosure, an example method for diagnosing misalignment of a transmitter element of an open path gas detecting device may be provided. In some examples, the example method may comprise: causing at least one detector component of a receiver element of the open path gas detecting device to generate a first light intensity indication corresponding to first infrared light; causing the at least one detector component to generate a second light intensity indication corresponding to second infrared light; and generating an alignment indication based at least in part on the first light intensity indication and the second light intensity indication.

In accordance with various examples of the present disclosure, a gas detecting device is provided. The gas detecting device may comprise a receiver element and a microcontroller electronically coupled to the receiver element.

In some examples, the receiver element may comprise a detection channel and a diagnosis channel. In some examples, each of the detection channel and the diagnosis channel may be configured to generate a light intensity indication corresponding to infrared light received by the receiver element. In some examples, the detection channel may be in a parallel arrangement with the diagnosis channel. In some examples, an effective field of view of the diagnosis channel may be smaller than the effective field of view of the detection channel.

In some examples, the microcontroller may be configured to: generate an alignment indication based at least in part on a first light intensity indication generated by the detection channel and a second light intensity indication generated by the diagnosis channel. In some examples, the alignment indication may indicate whether the receiver element is misaligned.

In some examples, the microcontroller may further be configured to: calculate a ratio value based on the first light intensity indication and the second light intensity indication; and determine whether the ratio value satisfies a predetermined threshold.

In some examples, the microcontroller may be further configured to: in response to determining that the ratio value satisfies the predetermined threshold, generate the alignment indication to indicate that the receiver element is not misaligned to the transmitter element.

In some examples, the microcontroller may be further configured to: in response to determining that the ratio value does not satisfy the predetermined threshold, generate the alignment indication to indicate that the receiver element is misaligned to the transmitter element.

In accordance with various examples of the present disclosure, an example method for diagnosing misalignment of a receiver element of an open path gas detecting device may be provided. In some examples, the example method may comprise causing the detection channel to generate a first light intensity indication corresponding to the infrared light; causing the diagnosis channel to generate a second light intensity indication corresponding to the infrared light; and generating an alignment indication based at least in part on the first light intensity indication and the second light intensity indication. In some examples, the alignment indication may indicate whether the receiver element is misaligned.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative examples may be read in conjunction with the accompanying figures. It will be appreciated that, for simplicity and clarity of illustration, components and elements illustrated in the figures have not necessarily been drawn to scale, unless described otherwise. For example, the dimensions of some of the components or elements may be exaggerated relative to other elements, unless described otherwise. Examples incorporating teachings of the present disclosure are shown and described with respect to the figures presented herein, in which:

FIG. 1A illustrates an example view of an example open path gas detecting device in accordance with various examples of the present disclosure;

DETAILED DESCRIPTION OF THE INVENTION

Figure 1C:
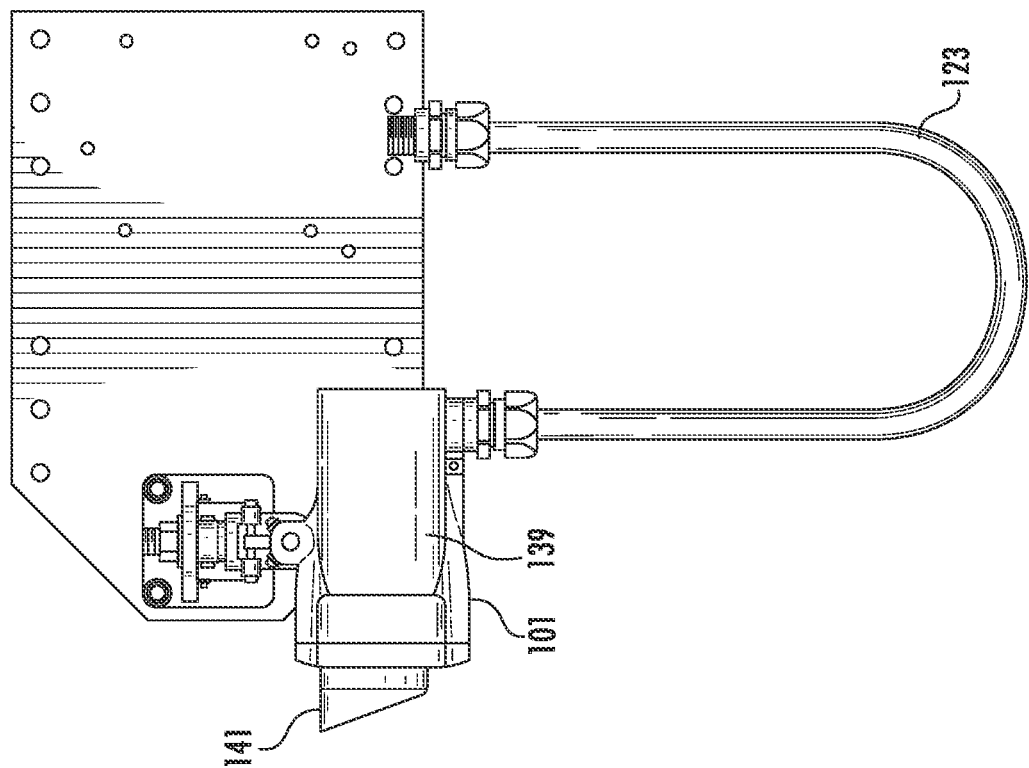
FIG. 1B and FIG. 1C illustrate example views of an example transmitter element in accordance with various examples of the present disclosure.

Some examples of the present disclosure will now be described more fully hereinafter with reference to the accompanying drawings, in which some, but not all examples of the disclosure are shown. Indeed, these disclosures may be embodied in many different forms and should not be construed as limited to the examples set forth herein; rather, these examples are provided so that this disclosure will satisfy applicable legal requirements. Like numbers refer to like elements throughout.

The phrases "in one example," "according to one example," "in some examples," and the like generally mean that the particular feature, structure, or characteristic following the phrase may be included in at least one example of the present disclosure and may be included in more than one example of the present disclosure (importantly, such phrases do not necessarily refer to the same example).

If the specification states a component or feature "may," "can," "could," "should," "would," "preferably," "possibly," "typically," "optionally," "for example," "as an example," "in some examples," "often," or "might" (or other such language) be included or have a characteristic, that specific component or feature is not required to be included or to have the characteristic. Such component or feature may be optionally included in some examples, or it may be excluded.

The word "example" or "exemplary" is used herein to mean "serving as an example, instance, or illustration." Any implementation described herein as "exemplary" is not necessarily to be construed as preferred or advantageous over other implementations.

The term "electronically coupled," "electronically coupling," "electronically couple," "in communication with," "in electronic communication with," or "connected" in the present disclosure refers to two or more elements or components being connected through wired means and/or wireless means, such that signals, electrical voltage/current, data and/or information may be transmitted to and/or received from these elements or components.

In some examples, existing gas detecting devices are plagued by challenges and limitations. For example, many gas detecting devices do not have the capability to identify and/or diagnose misalignment of various components of the gas detecting device. When misalignment occurs, the performance of these gas detecting devices may be impacted.

One example of a gas detecting device is as an "open path gas detecting device," which refers to a type of gas detectors that may be configured to detect, measure, and/or identify a concentration level of one or more gaseous substances ("target gaseous substance) in an area and/or along a path. In some examples, the open path gas detecting device may be based on a spectroscopic sensor such as a nondispersive infrared (NDIR) sensor. For example, an example open path gas detecting device may comprise at least two elements: a transmitter element and a receiver element. The transmitter element may be positioned at a distance from the receiver element, forming an optical path between the transmitter element and the receiver element.

The transmitter element may be configured to emit infrared light (also referred to as infrared radiation herein). The infrared light may travel along the optical path between the transmitter element and the receiver element, and gaseous substance along the optical path may absorb at least some of infrared light. The infrared light may ultimately be received and detected by the receiver element. The receiver element may comprise at least one detector component, which may detect, measure, and/or identify the intensity level of the infrared light that has travelled through the gaseous substance along the optical path and received by the receiver element. For example, the at least one detector component may comprise a sensor that may comprise a photodiode active area to detect, measure, and/or identify intensity level of the infrared light. Additionally, or alternatively, other suitable sensor(s) may be implemented to detect, measure, and/or identify the intensity level of the infrared light or the infrared radiation.

Based on the intensity level of the infrared light as detected by receiver element, the open path gas detecting device may calculate the level of infrared light that has been absorbed by the gaseous substance along the optical path, and therefore may, in some examples, determine the concentration level of the gaseous substance. Additional details of the open path gas detecting device, the transmitter element, and the receiver element are described further herein.

As shown in the above example, an accurate alignment of both the transmitter element and the receiver element may be important to operations of the open path gas detecting device. For example, an open path gas detecting device may rely upon the correct alignment to deliver robust and error-free operation in adverse environmental conditions (for example, severe weather conditions such as snowing, raining, dense fog condition). Errors in the alignment of the transmitter element and/or the receiver element may impact the performance of an open path gas detecting device in a number of ways.

For example, a misalignment between the transmitter element and the receiver element may reduce the light throughput of the open path gas detecting device, therefore limiting the capability for the open path gas detecting device to detect, measure, and/or identify gaseous substance in adverse environmental conditions such as a dense fog condition. As another example, a misalignment may increase sensitivity of the open path gas detecting device to partial obscuration, which may result in the open path gas detecting device producing erroneous readings of concentration level of the target gaseous substance. As another example, a misalignment may cause increased sensitivity of the open path gas detecting device to vibration. As another example, a misalignment may reduce the capability of the open path gas detecting device to adjust to changes in alignment that may occur as a consequence of installation conditions. For example, the transmitter element and the receiver element may be installed on two different locations, and the relative position between these two difference locations may change during the course of operation.

Examples of the present disclosure may overcome many challenges and limitations associated with gas detecting devices. For example, examples of the present disclosure may provide an effective means of detecting errors in alignment of the transmitter element and/or the receiver element that may occur, for example, during operation of the open path gas detecting device. Examples of the present disclosure may signal those errors to an operator, and enable the operator to take appropriate action to realign the transmitter element and/or the receiver element prior to the open path gas detecting device exhibiting a degradation in performance.

Referring now to FIG. 1A, FIG. 1B, FIG. 1C, FIG. 1D, and FIG. 1E, example views of example components of an example open path gas detecting device are illustrated. In the example shown in FIG. 1A, the example open path gas detecting device may comprise a transmitter element 101 and a receiver element 103.

In some examples, the transmitter element 101 may be configured to produce, generate, emit, and/or trigger the production, generation, and/or emission of infrared light. For example, the transmitter element 101 may comprise an infrared light source component that may produce, generate, and/or emit infrared light. Example infrared light source components may include, but are not limited to, gas discharge lamps, fluorescent lamps, heat lamps, and/or the like. The term "gas discharge lamp" refers to a type of artificial light source that may generate light by sending an energy discharge (such as electric discharge) through an ionized gas. As an example, the infrared light source component of the transmitter element 101 may comprise a xenon arc flashlamp. An example xenon arc flashlamp may produce, generate, and/or emit beams of light by discharging electricity through ionized xenon gas, and the light produced, generated, and/or emitted by the xenon arc flashlamp may comprise infrared light.

While the above description illustrates a xenon arc flashlamp as an example infrared light source component, it is noted that the scope of the present disclosure is not limited to xenon arc flashlamps. Additionally, or alternatively, examples of the present disclosure may implement other type(s) of infrared light source component(s) for producing infrared light.

In some examples, the infrared light may be produced at an intense level by the infrared light source component of the transmitter element 101. In some examples, the infrared light source component may be electronically coupled to a power source component, and the power source component may supply power to the infrared light source component to generate discharge energy for triggering infrared light. For example, the example xenon arc flashlamp may produce infrared light that has a pulse frequency of 4 Hz, and each pulse of infrared light may have a duration of approximately one microsecond. The pulse frequency, extremely short duration of these pulses of light, and/or the shape of the discharge pulses may distinguish the infrared light generated by the xenon arc flashlamp from other natural and artificial sources of infrared light in the environment. As a result, the receiver element 103 may detect, measure, and/or identify infrared light produced by the xenon arc flashlamp of the transmitter element 101.

While the above description illustrates example pulse frequency and duration of the infrared light generated by an example xenon arc flashlamp, it is noted that the scope of the present disclosure is not limited to these examples only. For example, examples of the present disclosure may include infrared light produced at a pulse frequency higher than or lower than 4 Hz. Additionally, or alternatively, examples of the present disclosure may include infrared light that have a duration of less than or more than one microsecond.

In some examples, the infrared light produced by the infrared light source component may be collimated. For example, the transmitter element 101 may comprise one or more optical components (such as optical collimating lens) to redirect and/or adjust the direction of the infrared light generated by the infrared light source component. As a result, parallel beams of infrared light may be emitted from the transmitter element 101 through the infrared light source component and the one or more optical components.

Figure 1B:
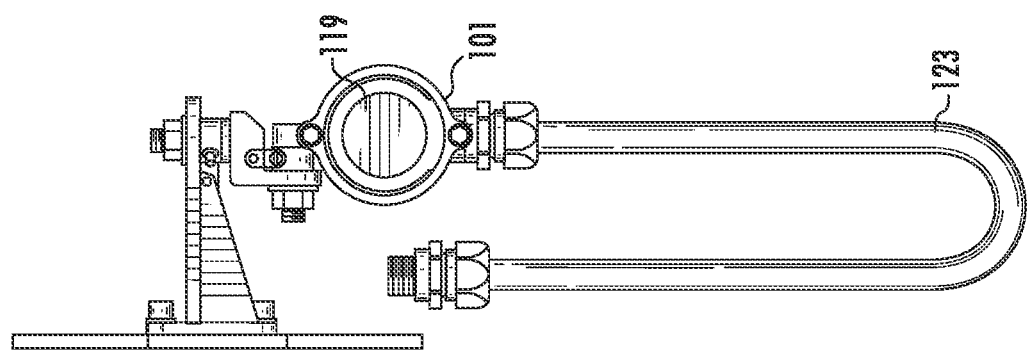

Referring now to FIG. 1B and FIG. 1C, a front view and a side view of the transmitter element 101 are illustrated, respectively.

In the example shown in FIG. 1C, the transmitter element 101 may comprise a housing 139, which may provide an enclosure for various components of the transmitter element 101 (for example, an infrared light source component and one or more optical components described above). In some examples, the transmitter element 101 may comprise a conduit component 123. The conduit component 123 may be connected to the transmitter element 101, which may provide a protective enclosure for electrical wire(s) that may connect components within the housing 139 (for example, an infrared light source component) with components that are outside of housing 139 (for example, a power source component).

In the example shown in FIG. 1B, infrared light generated by the infrared light source component may pass through the window lens component 119. In some examples, the window lens component 119 may comprise glass and/or other transparent material that may allow the infrared light to pass through. In some examples, the window lens component 119 may be heated to minimize condensation, frosting and/or buildup of snow. In some examples, the transmitter element 101 may comprise an awning component (for example, the awning component 141 as shown in FIG. 1C) that may protect the window lens component 119 from rain, snow, and/or other particles that may fall on the window lens component 119.

Referring back to FIG. 1A, the transmitter element 101 may be connected to an mounting bracket 111 through a pivot block 105. As an example, the transmitter element 101 may be connected to the pivot block 105 through a fastener 125 (such as a bolt and a nut). As an example, the pivot block 105 may be fastened to the mounting bracket 111 through a fastener 127 (such as a bolt and a nut). Prior to the fastener 125 and the fastener 127 being tightened, the transmitter element 101 may rotate to a desired angle, such that the transmitter element 101 may align with the receiver element 103. For example, prior to the fastener 125 being tightened, the transmitter element 101 may rotate around a horizontal axis. Prior to the fastener 127 being tightened, the pivot block 105 may rotate around a vertical axis, which may in turn cause the transmitter element 101 to rotate around the vertical axis.

While the above description illustrates example structural connections and relationships between the transmitter element 101 and various other components of the example open path gas detecting device, it is noted that the scope of the present disclosure is not limited to these example structural connections and relationships only. Additionally, or alternatively, the transmitter element 101 may be connected and/or fastened to other components of the example open path gas detecting device through other means or in other ways.

Referring back to FIG. 1A, the mounting bracket 111 may be fastened to the mounting plate 109 through one or more fasteners (such as screws), and the mounting plate 109 may be fastened to a secured structure (for example, a wall) through one or more fasteners (such as screws).

In the example shown in FIG. 1A, a junction box component 121 may be securely fastened to the mounting plate 109. The junction box component 121 may provide a protective enclosure for various components of the open path gas detecting device (such as a power source component, electric circuits including processing circuitry (such as a microcontroller), memory circuitry, and/or the like). In some examples, the conduit component 123 may be connected to the transmitter element 101 and the junction box component 121, and one or more components within the junction box component 121 may be connected to components within the transmitter element 101 through electrical wire(s) that are disposed within the conduit component 123, as described above.

In some examples, the receiver element 103 may be configured to detect, measure, and/or identify the intensity level of the infrared light. The infrared light generated by the transmitter element 101 may travel through an optical path between the transmitter element 101 and the receiver element 103 (for example, the optical path D as shown in FIG. 1A). In some examples, the distance of the optical path D (for example, the distance between the window lens component 129 of the receiver element and the window lens component 119 of the transmitter element 101) may be between 5 meters to 350 meters. In some examples, the distance of the optical path D may have other values.

Figure 1E:
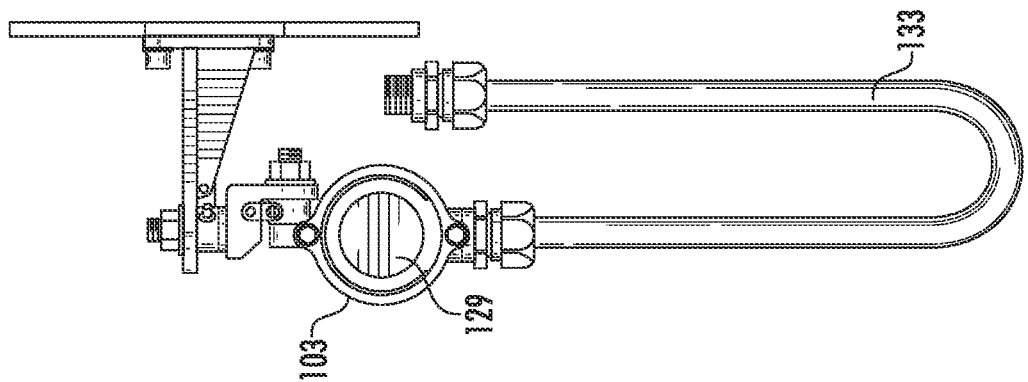
FIG. 1D and FIG. 1E illustrate example views of an example receiver element in accordance with various examples of the present disclosure.
Figure 1D:
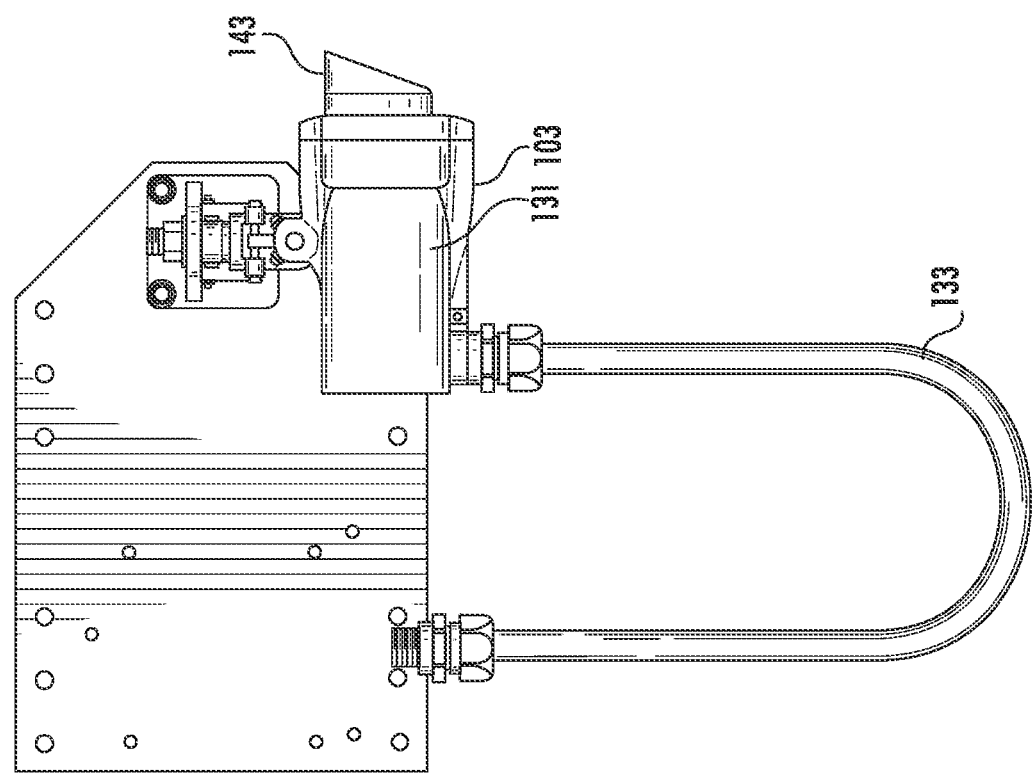

Referring now to FIG. 1D and FIG. 1E, a side view and a front view of the receiver element 103 are illustrated, respectively.

As described above, gaseous substance along the optical path D may absorb at least some of the infrared light transmitted by the transmitter element 101. The infrared light may travel through the window lens component 129 of the receiver element 103, and the receiver element 103 may comprise at least one detector component to detect, measure, and/or identify the absorption level of the infrared light by the gaseous substance along the optical path D. Based on the absorption level, the open path gas detecting device may detect, measure, and/or identify the concentration level of the gaseous substance.

In some examples, the receiver element 103 may comprise a sample detector component and a reference detector component. In some examples, the receiver element 103 may comprise an optical component that may divide the infrared light into two or more portions (for example, but not limited to, a beam splitter component, a selective filter component (for example, a selective bandpass filter).

In some examples, at least a portion of the infrared light may travel through a sample filter component and arrive at the sample detector component. As described above, the gaseous substance to be detected ("target gaseous substance") may absorb at least some of the infrared light, and the sample filter component may filter the infrared light at wavelength(s) and/or wavelength range(s) where the target gaseous substance may absorb the infrared light. Accordingly, the sample detector component may detect the intensity level of infrared light at such wavelength(s) and/or wavelength range(s) where target gaseous substance may absorb the infrared light.

In some examples, at least a portion of the infrared light may travel through a reference filter component and arrive at the reference detector component. The reference filter component may filter the infrared light at wavelength(s) and/or wavelength range(s) where the target gaseous substance may not or may be less likely to absorb the infrared light. Accordingly, the reference detector component may detect the intensity level of infrared light at such wavelength(s) and/or wavelength range(s) where target gaseous substance may not or may be less likely to absorb the infrared light.

In some examples, by calculating a difference or ratio value between the intensity level of infrared light detected by the sample detector component and the intensity level of infrared light detected by the reference detector component, the example open path gas detecting device may determine the concentration level of target gaseous substance along the optical path D.

In the example shown in FIG. 1D and FIG. 1E, the receiver element 103 may comprise a housing 131, which may provide an enclosure for various components of the receiver element 103 (for example, the sample detector component, the sample filter component, the reference detector component, and the reference filter component described above).

In some examples, the receiver element 103 may comprise a conduit component 133. The conduit component 133 may be connected to the receiver element 103, which may provide a protective enclosure for electrical wire(s) that may connect components within the housing 131 (for example, the sample detector component, the reference detector component) with components that are outside of housing 131. For example, the sample detector component and the reference detector component may be connected to various electronic components to amplify, condition and/or process the signals received by the sample detector component and the reference detector component. As an example, the sample detector component and/or the reference detector component may be connected to a digital signal processor (DSP), which may be configured to perform signal processing calculations.

Additionally, or alternatively, a microprocessor may be implemented to control the overall function of the open path gas detecting device. For example, the microprocessor may be electronically coupled to the transmitter element 101 and/or the receiver element 103, and may perform the final calculations to determine reading of the concertation level of the target gaseous substance, and may output state of the open path gas detecting device.

Referring back to FIG. 1D and FIG. 1E, infrared light may travel through the window lens component 129 of the receiver element 103. In some examples, the window lens component 129 may be heated to minimize condensation, frosting and/or buildup of snow. In some examples, the level of heating applied to the window lens component 129 may be controlled by the microcontroller, and may be adjusted from zero to maximum depending on the temperature of the window lens component 129. In some examples, the receiver element 103 may comprise an awning component (for example, the awning component 143 as shown in FIG. 1D) that may protect the window lens component 129.

Referring back to FIG. 1A, the receiver element 103 may be connected to an mounting bracket 115 through a pivot block 107. As an example, the receiver element 103 may be connected to the pivot block 107 through a fastener 135 (such as a bolt and a nut). As an example, the pivot block 107 may be fastened to the mounting bracket 115 through a fastener 137 (such as a bolt and a nut). Prior to the fastener 135 and the fastener 137 being tightened, the receiver element 103 may rotate to a desired angle, such that the receiver element 103 may align with the transmitter element 101. For example, prior to the fastener 135 being tightened, the receiver element 103 may rotate around a horizontal axis. Prior to the fastener 137 being tightened, the pivot block 107 may rotate around a vertical axis, which may in turn cause the receiver element 103 to rotate around the vertical axis.

While the above description illustrates example structural connections and relationships between the receiver element 103 and various other components of the example open path gas detecting device, it is noted that the scope of the present disclosure is not limited to these example structural connections and relationships only. Additionally, or alternatively, the receiver element 103 may be connected and/or fastened to other components of the example open path gas detecting device through other means or in other ways.

Referring back to FIG. 1A, the mounting bracket 115 may be fastened to the mounting plate 113 through one or more fasteners (such as screws), and the mounting plate 113 may be fastened to a secured structure (for example, a wall) through one or more fasteners (such as screws).

In the example shown in FIG. 1A, a junction box component 117 may be securely fastened to the mounting plate 113. The junction box component 117 may provide a protective enclosure for various components of the open path gas detecting device (such as electronic components describe above). In some examples, the conduit component 133 may be connected to the receiver element 103 and the junction box component 117, and one or more components within the junction box component 117 may be connected to components within the receiver element 103 through electrical wire(s) that are disposed within the conduit component 133, as described above.

While the above description and FIGS. 1A-1E illustrate various example components of an example open path gas detecting device, it is noted that the scope of the present disclosure is not limited to these example components only. In some examples, an example open path gas detecting device may comprise less than or more than these example components as illustrated in FIGS. 1A-1E. Additionally, or alternatively, an example open path gas detecting device may comprise other components, including but not limited to, aimer, viewfinder, and/or the like.

Figure 2:
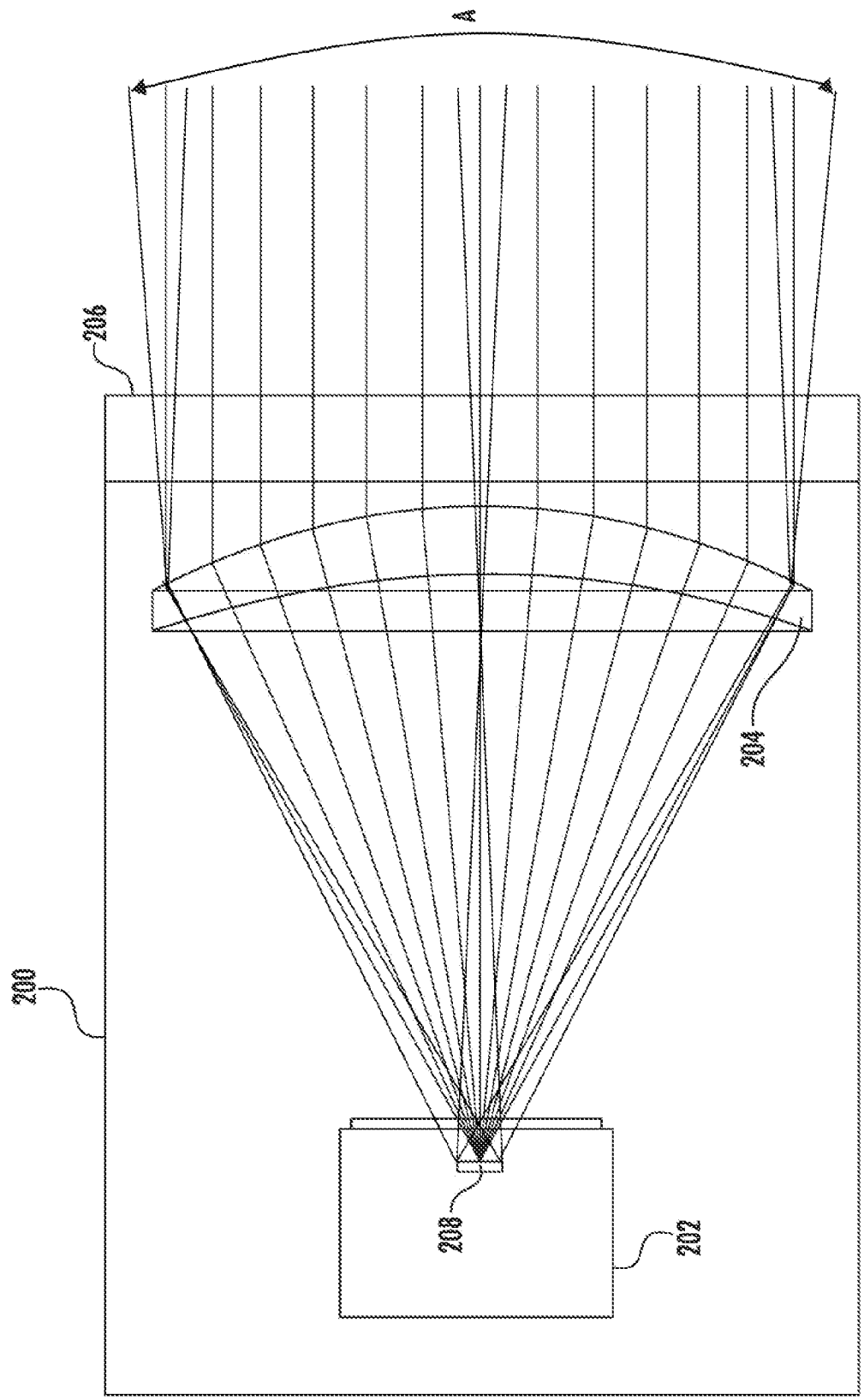
FIG. 2 illustrates an example diagram for an example transmitter element in accordance with various examples of the present disclosure.

Referring now to FIG. 2, an example diagram illustrating various components of an example transmitter element 200 of an example open path gas detecting device is shown.

In the example shown in FIG. 2, the example transmitter element 200 may comprise an infrared light source component 202, an optical component 204, and a window lens component 206.

In some examples, the infrared light source component 202 may be disposed within the transmitter element 200. For example, the infrared light source component 202 may be securely positioned on an inner surface of the transmitter element 200.

In some examples, the infrared light source component 202 may be configured to produce, generate, and/or emit infrared light. For example, the infrared light source component 202 may comprise a xenon arc flashlamp. As described above, the xenon arc flashlamp may produce, generate, and/or emit beams of light by discharging energy through ionized xenon gas, and the light produced, generated, and/or emitted by the xenon arc flashlamp may comprise infrared light.

In some examples, the xenon arc flashlamp may be connected to a lamp drive component. For example, the lamp drive component may comprise a power source component, which may provide a power source for the xenon arc flashlamp to discharge energy through ionized xenon gas as described above. In such an example, the discharge energy level of the xenon arc flashlamp may be associated with the power provided by the power source component. For example, the power source component may comprise a 24 VDC power supply, which may be connected to the xenon arc flashlamp through electric wire(s). Additionally, or alternatively, the power source component may comprise an adjustable power supply that may provide voltage to power the xenon arc flashlamp at one or more different levels. For example, the voltage level of the adjustable power supply may be controlled by a microcontroller. The higher the voltage level provided to the xenon arc flashlamp, the higher the discharge energy that the xenon arc flashlamp may have.

In some examples, when the xenon arc flashlamp is connected to the lamp drive component (for example, a power source component) and powered on, the xenon arc flashlamp may generate an arc 208. The arc 208 may produce, generate, and/or emit infrared light beams. In the example shown in FIG. 2, the infrared light beams produced, generated, and/or emitted by the arc 208 may have a beam divergence value A. The term "beam divergence" refers to an angular measurement of an increase in the beam diameter (or radius) with respect to an increase of distance from the beam source (for example, the arc 208) where the beam emerges. In some examples, the beam divergence value A may be affected by the size of the arc 208. A lower discharge energy of the xenon arc flashlamp may reduce the size of the arc 208, which in turn reduces the field angle (or divergence angle) of the beam after the optical component 204 (for example, silicon lens), resulting in a reduced angular spread of the beam. In some examples, the primary effect of reducing discharge energy may be to reduce the size of the arc 208. The smaller arc size may result in a more tightly collimated beam from the transmitter after the silicon lens. However, it is noted that, in some examples, divergence value A may not change significantly with discharge energy and the size of the arc 208.

In some examples, the size of the arc 208 may be a function of the discharge energy of the xenon arc flashlamp. For example, the higher the discharge energy, the larger the size of the arc 208. In some examples, the beam divergence value A may be modulated between two or more values by periodically adjusting or changing the discharge energy of the xenon arc flashlamp.

Referring back to FIG. 2, the optical component 204 may be disposed within the transmitter element 200. For example, the edge of the optical component 204 may be securely attached on an inner surface of the transmitter element 200. In some examples, the optical axis of the optical component 204 (for example, the central axis of the optical component 204) may be aligned with the infrared light source component 202. For example, the optical component 204 may be positioned such that the optical axis may pass through the center of the arc 208. In some examples, the optical component 204 may be structurally connected to the transmitter element 200 in other ways.

In some examples, the optical component 204 may be configured to collimate the infrared light beams generated by the arc 208. As an example, the optical component 204 may comprise one or more optical collimating lens, such as but not limited to one or more lens having spherical surface(s), one or more lens having parabolic surface(s) and/or the like. For example, the optical component 204 may comprise silicon meniscus lens.

In the example shown in FIG. 2, the infrared light beams generated by the arc 208 may pass through the optical component 204, and the infrared light beams may be collimated by the optical component 204 into parallel or approximately parallel rays of infrared light. In some examples, the optical component 204 may have an effective focal length of seventy-five millimeters. In some examples, the optical component 204 may have an effective focal length of other value(s).

Subsequent to passing through the optical component 204, the infrared light beams may pass through the window lens component 206 of the transmitter element 200.

While the above description illustrates example components of a transmitter element 200 of an example open path gas detecting device, it is noted that the scope of the present disclosure is not limited to these example components only. In some examples, an example transmitter element may comprise less than or more than those components illustrated in FIG. 2. For example, a processor circuitry (such as a microcontroller) may be connected to the infrared light source component 202 (or to a power source component that is electronically coupled the infrared light source component 202) to control the discharge energy of the xenon arc flashlamp. Additional details are described further herein.

In some examples, at least a portion of the infrared light beams emitted from the transmitter element 200 may be absorbed by the gaseous substance along the optical path between the transmitter element 200 and a receiver element of the example open path gas detecting device, and the receiver element may comprise one or more detector components to detect, measure, and/or identify the intensity level of infrared light.

As described above, it may be necessary to determine if the transmitter element is aligned correctly to the receiver element (i.e. pointing directly at the receiver element), such that the open path gas detecting device may produce an accurate reading. In some examples, the direction of infrared light emitted by the transmitter element may be accessed or evaluated to determine if the transmitter element is aligned correctly to the receiver element. For example, the receiver element may generate a measurement corresponding to the intensity level of the infrared light received by the receiver element, and the measurement may be compared against an predetermined value (for example, an expected intensity level of the infrared light if the transmitter element is aligned correctly to the receiver element). Based on the measurement equals to or approximates the predetermined value, it may be determined that the transmitter element is aligned correctly to the receiver element. Based on the difference between the measurement and the predetermined value exceeding the predetermined threshold, it may be determined that the transmitter element is not aligned correctly to the receiver element.

While the description above provides an example solution to diagnosing misalignment of the transmitter element, technical challenges exist when implementing the example solution. For example, the alignment of the receiver element may also directly influence the received infrared light intensity by the receiver element, and it can be technical challenging to differentiate between an alignment error in the transmitter element and an alignment error of the receiver element. As another example, the received infrared light intensity at the receiver element may be affected by the light transmission through window lens component of the receiver element and/or the transmitter element and by light absorption along the optical path. If the receiver element detects, measures, and/or identifies a lower than expected intensity level of infrared light, it can be technical challenging to determine whether the lower than expected intensity level is caused by an alignment error of the transmitter element or caused by light absorption due to for example, dirt on the window lens component.

Figure 3:
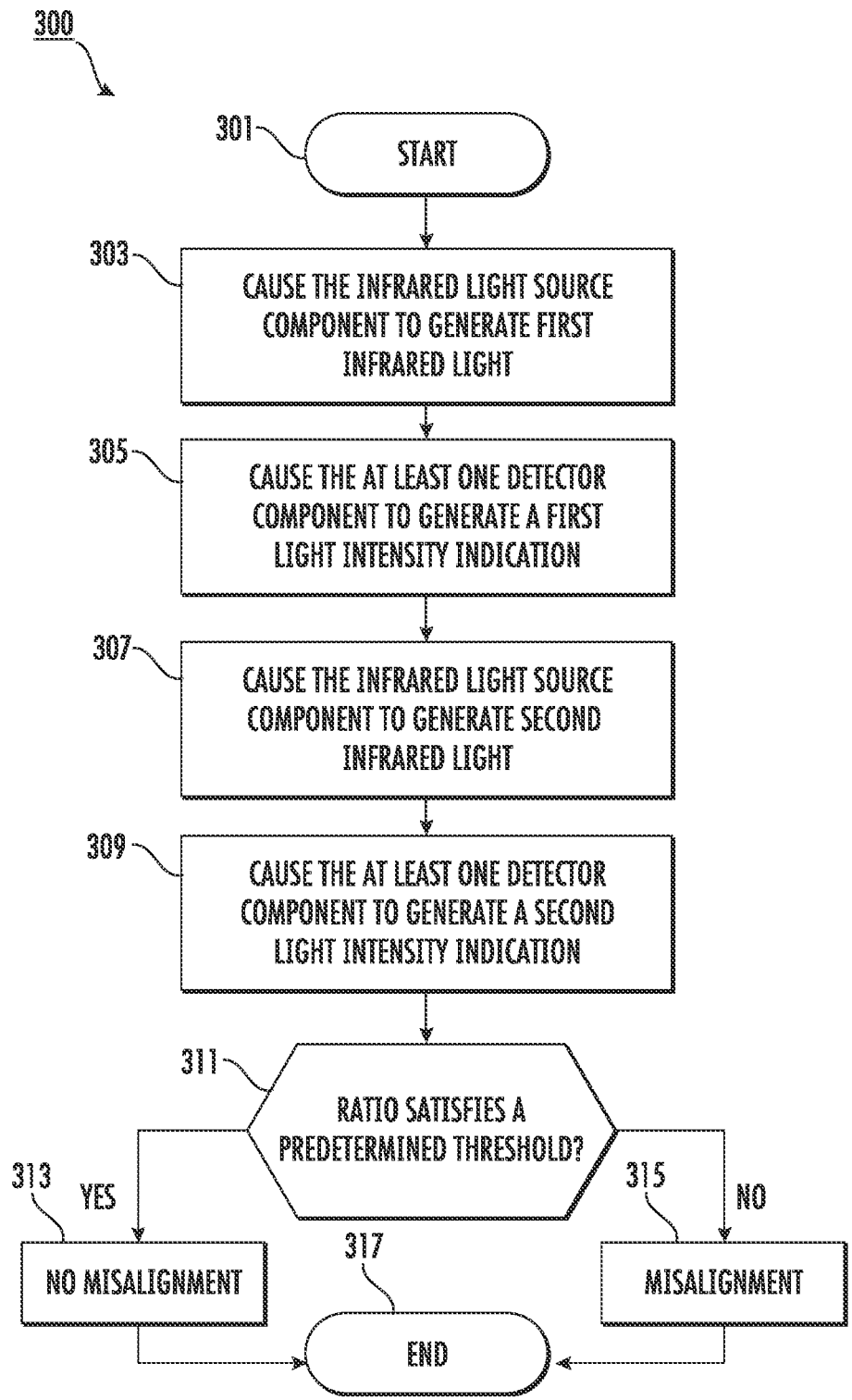
FIG. 3 illustrates an example flowchart for an example method for diagnosing misalignment of an example transmitter element in accordance with various examples of the present disclosure.

Referring now to FIG. 3, an example flowchart illustrates an example method 300 in accordance with examples of the present disclosure. In particular, the example method 300 may provide technical solutions for diagnosing misalignment of the transmitter element. In some examples, the example method 300 may overcome the technical challenges discussed above.

It is noted that each block of the flowchart, and combinations of blocks in the flowchart, may be implemented by various means such as hardware, firmware, circuitry and/or other devices associated with execution of software including one or more computer program instructions. For example, one or more of the procedures described in FIG. 3 may be embodied by computer program instructions, which may be stored by a non-transitory memory of an apparatus employing an example of the present disclosure and executed by a processor in the apparatus. These computer program instructions may direct one or more components of the transmitter element and/or the receiver element of the open path gas detecting device to function in a particular manner, such that the instructions stored in the computer-readable storage memory produce an article of manufacture, the execution of which implements the function specified in the flowchart block(s).

As will be understood, the processor may be embodied in a number of different ways. For example, the processor may be embodied as one or more complex programmable logic devices (CPLDs), microprocessors, multi-core processors, coprocessing entities, application-specific instruction-set processors (ASIPs), microcontroller and/or controllers. Further, the processor may be embodied as one or more other processing devices or circuitry. The term circuitry may refer to an entirely hardware example or a combination of hardware and computer program products. Thus, the processor may be embodied as integrated circuits, application specific integrated circuits (ASICs), field programmable gate arrays (FPGAs), programmable logic arrays (PLAs), hardware accelerators, other circuitry, and/or the like. As will therefore be understood, the processor may be configured for a particular use or configured to execute instructions stored in volatile or non-volatile media or otherwise accessible to the processor. As such, whether configured by hardware or computer program products, or by a combination thereof, the processor may be capable of performing steps or operations according to examples of the present disclosure when configured accordingly.

As will be understood, the non-transitory memory may include one or more non-volatile storage or storage media, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-transitory memory may store databases, database instances, applications, programs, program modules, scripts, source code, object code, byte code, compiled code, interpreted code, machine code, executable instructions, and/or the like. The term database, database instance, database management system entity, and/or similar terms used herein interchangeably and in a general sense to refer to a structured or unstructured collection of information/data that is stored in a computer-readable storage medium.

As will be understood, examples of the present disclosure may be configured as methods, devices, and the like. Accordingly, examples may comprise various means including entirely of hardware or any combination of software and hardware. Furthermore, examples may take the form of a computer program product on at least one non-transitory computer-readable storage medium having computer-readable program instructions (e.g., computer software) embodied in the storage medium. Similarly, examples may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

Referring back to FIG. 3, the example method 300 may start at block 301. At block 303, a processing circuitry (for example, a microcontroller electronically coupled to a transmitter element and/or a receiver element of an example open path gas detecting device) may cause the infrared light source component to generate first infrared light.

As described above, the infrared light source component may comprise a xenon arc flashlamp. The xenon arc flashlamp may produce, generate, and/or emit beams of infrared light by discharging electricity through ionized xenon gas. For example, when the xenon arc flashlamp is connected to the lamp drive component (for example, a power source component) and powered on, the xenon arc flashlamp may generate an arc.

In some examples, the processing circuitry may cause the infrared light source component to generate first infrared light triggered at a first discharge energy level of the infrared light source component. For example, the processing circuitry may cause the power source component to supply power at a first voltage level (also referred to as a first voltage level power) to the xenon arc flashlamp. In some examples, the first voltage level may be a baseline voltage level such as 24 VDC. In some examples, the first voltage level may have other values. The first voltage level may provide a first discharge energy level to the xenon arc flashlamp, and the xenon arc flashlamp may generate the first infrared light in response to and/or triggered by the first discharge energy level.

At block 305, a processing circuitry (for example, a microcontroller electronically coupled to a transmitter element and/or a receiver element of an example open path gas detecting device) may cause the at least one detector component to generate a first light intensity indication. In some examples, the first light intensity indication may correspond to the first infrared light generated by the transmitter element and triggered at the first discharge energy level.

In some examples, the first light intensity indication may indicate a first intensity level of the first infrared light received by the receiver element. As described above, the receiver element may comprise one or more detector components that may detect, measure, and/or identify the intensity level of the beam of the infrared light. For example, the one or more detector components may generate one or more signals that may indicate the first intensity level of the first infrared light received by the receiver element. In some examples, the receiver element may process the one or more signals through one or more processors (such as a digital signal processor and/or a microprocessor as described above) to generate the first light intensity indication corresponding to the first infrared light received by the receiver element.

Figure 4:
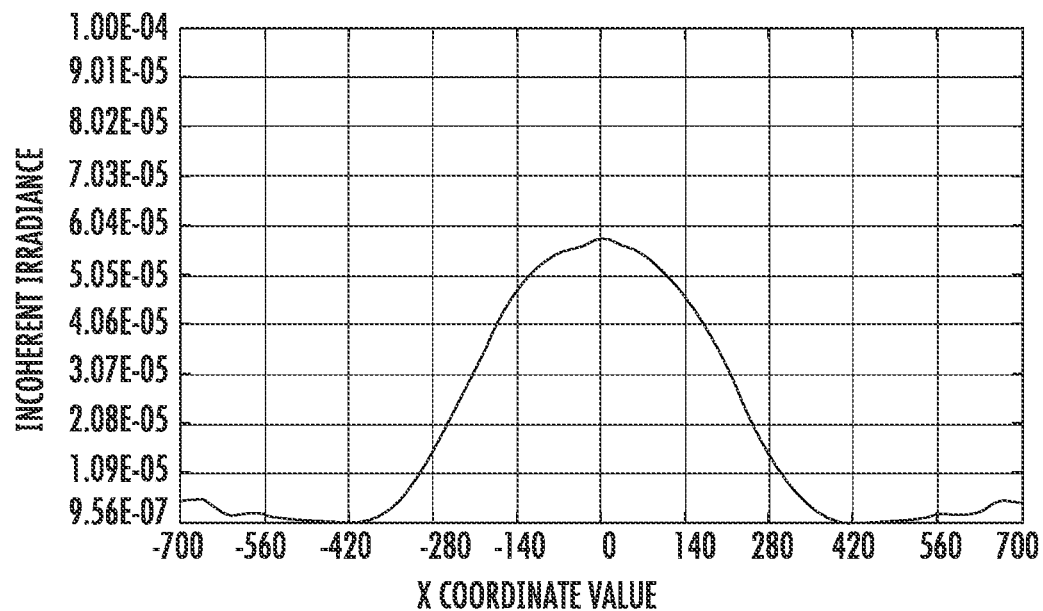
FIG. 4, FIG. 5, FIG. 6, and FIG. 7 illustrate example diagrams showing example irradiance levels in accordance with various examples of the present disclosure.
Figure 5:
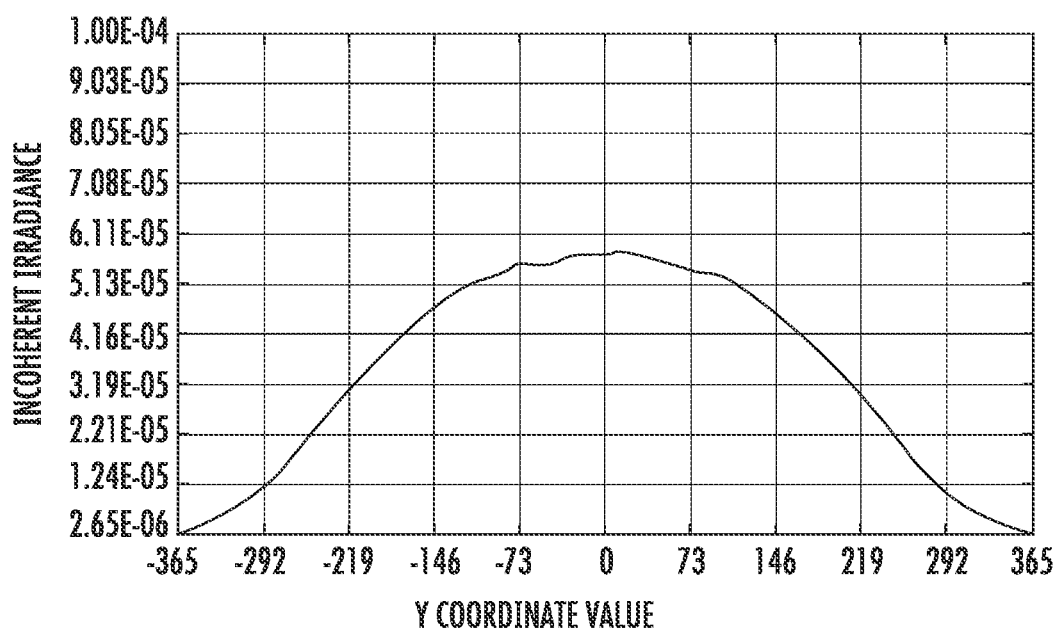

Referring now to FIG. 4 and FIG. 5, example diagrams illustrate example irradiance levels of the first infrared light received by the receiver element. The term "irradiance" refers to a measure of radiant power received by a surface or a plane per unit area. For example, FIG. 4 illustrates the irradiance levels of the first infrared light received by the receiver element at a horizontal plane of the receiver element. FIG. 5 illustrates the irradiance levels of the first infrared light received by the receiver element at a vertical plane of the receiver element. In some examples, these example irradiance levels may be determined based on the first light intensity indication generated by the receiver element.

At block 307, a processing circuitry (for example, a microcontroller electronically coupled to a transmitter element and/or a receiver element of an example open path gas detecting device) may cause the infrared light source component to generate second infrared light.

In some examples, the second infrared light may be triggered at a second discharge energy level. In some examples, the second discharge energy level may be different from the first discharge energy level described above in connection with block 303. For example, the processing circuitry may cause the power source component to supply power at a second voltage level (also referred to as a second voltage level power) to the xenon arc flashlamp. In some examples, the second voltage level may be a reduced voltage level such as 12 VDC. In some examples, the second voltage level may have other values. The second voltage level may provide a second discharge energy level to the xenon arc flashlamp, and the xenon arc flashlamp may generate the second infrared light in response to and/or triggered by the second discharge energy level.

At block 309, a processing circuitry (for example, a microcontroller electronically coupled to a transmitter element and/or a receiver element of an example open path gas detecting device) may cause the at least one detector component to generate a second light intensity indication.

Figure 6:
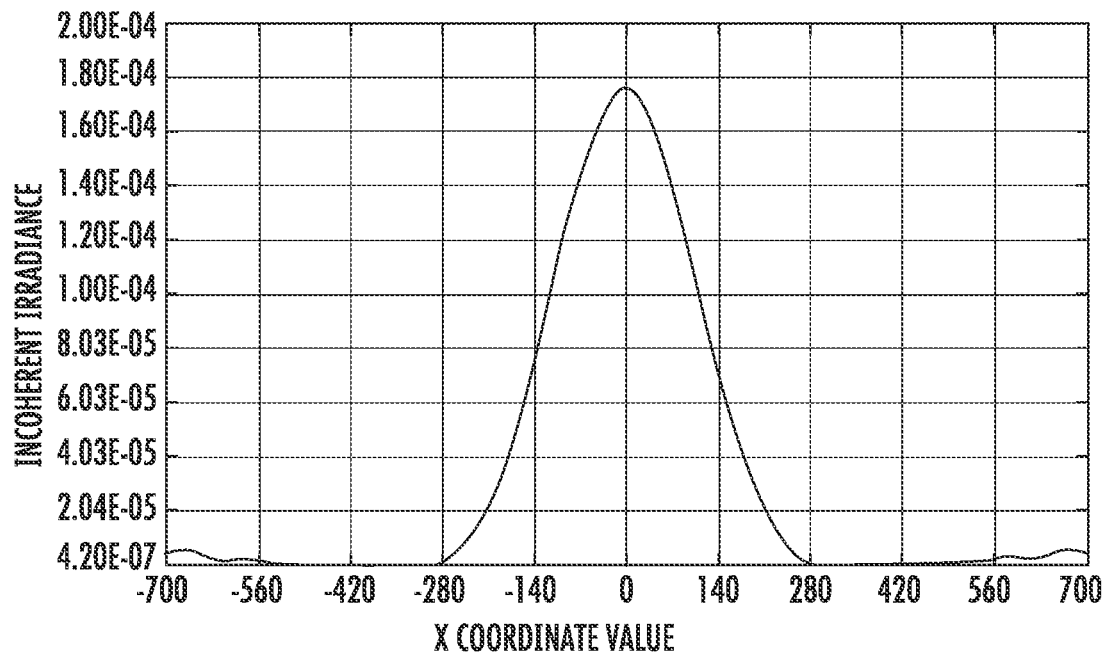
Figure 7:
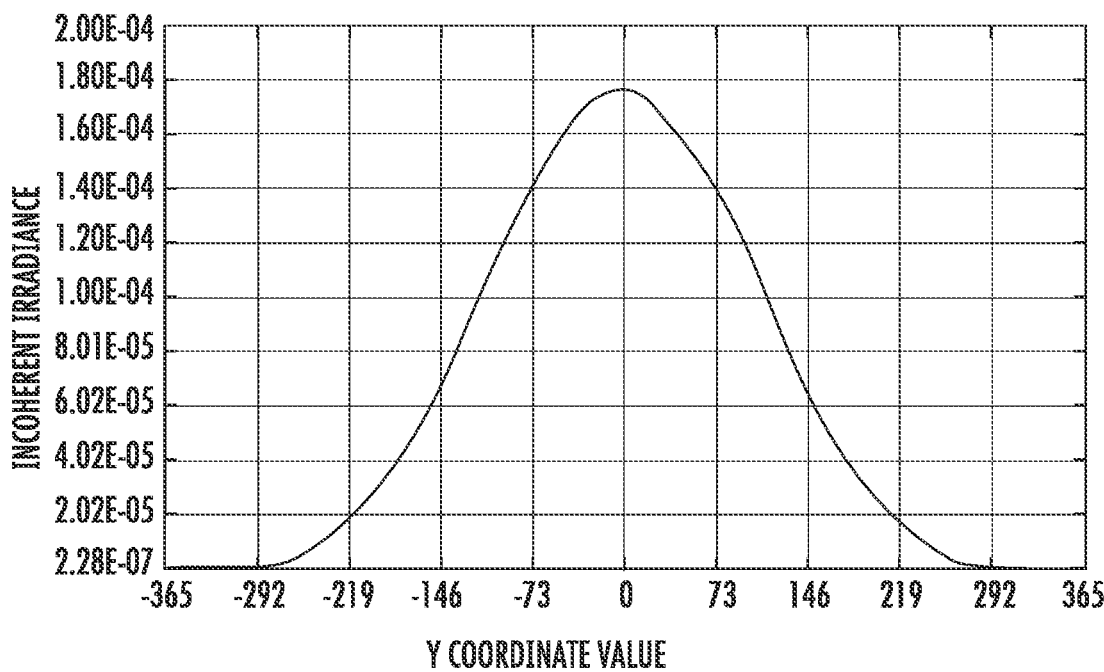

In some examples, the second light intensity indication may correspond to the second infrared light generated by the transmitter element at the second discharge energy level. For example, the second light intensity indication may indicate a second intensity level of the second infrared light received by the receiver element Referring now to FIG. 6 and FIG. 7, example diagrams illustrating example irradiance levels of the second infrared light received by the receiver element. For example, FIG. 6 illustrates the irradiance levels of the second infrared light received by the receiver element at a horizontal plane of the receiver element. FIG. 7 illustrates the irradiance levels of the second infrared light received by the receiver element at a vertical plane of the receiver element. In some examples, these example irradiance levels may be determined based on the second light intensity indication generated by the receiver element.

Comparing FIG. 6 and FIG. 4, the beam divergence value in the horizontal plane decreases as the discharge energy decreases from the first discharge energy level to the second discharge energy level. Comparing FIG. 7 and FIG. 5, the beam divergence value in the vertical plane also decreases as the discharge energy decreases from the first discharge energy level to the second discharge energy level.

In some examples, the processing circuitry may generate an alignment indication based at least in part on the first light intensity indication and the second light intensity indication. In some examples, the alignment indication may indicate whether the transmitter element is misaligned to the receiver element.

As described above, the first light intensity indication may indicate a first intensity level of the first infrared light received by the receiver element, and the second light intensity indication may indicate a second intensity level of the second infrared light received by the receiver element. In some examples, the processing circuitry may calculate a ratio value between first intensity level and the second intensity level.

As shown at block 311 of FIG. 3, a processing circuitry (for example, a microcontroller electronically coupled to a transmitter element and/or a receiver element of an example open path gas detecting device) may determine whether the ratio value satisfies a predetermined threshold.

As described above, the ratio value may be affected if the alignment of the transmitter element degrades. For example, when the transmitter element is correctly aligned with the receiver element, an alignment angle between a central axis of the transmitter element and a central axis of the receiver element is zero, and the ratio value may be at a predetermined value or within a predetermined threshold based on the first discharge energy and the second discharge energy.

As the alignment of the transmitter element degrades, the alignment angle may increase, result in a change of the ratio value.

In some examples, the predetermined value and/or the predetermined threshold may be determined or calculated when the transmitter element is correctly aligned to the receiver element. For example, during the initial installation of the transmitter element, the processing circuitry may determine the predetermined value and/or the predetermined threshold. Additionally, or alternatively, the predetermined value and/or the predetermined threshold may be determined based on, for example but not limited to, a system requirement that may correspond to a system toleration of the misalignment of the transmitter element.

Based on comparing the ratio value between first intensity level and the second intensity level with the predetermined value and/or the predetermined threshold, examples of the present disclosure may remove the dependency on absolute values to diagnose transmitter element misalignment, and may overcome technical challenges discussed above.

Referring back to FIG. 3, if, at block 311, the processing circuitry determines that the ratio value satisfies the predetermined threshold, the processing circuitry may determine that there is no misalignment of the transmitter element at block 313.

For example, when the ratio value is a positive value and is less than the predetermined threshold, the processing circuitry may determine that the ratio value satisfies the predetermined threshold. As another example, when the ratio value is a negative value and is more than the predetermined threshold, the processing circuitry may determine that the ratio value satisfies the predetermined threshold. In some examples, the processing circuitry may generate the alignment indication to indicate that the transmitter element is not misaligned to the receiver element.

If, at block 311, the processing circuitry determines that the ratio value does not satisfies the predetermined threshold, the processing circuitry may determine that there is misalignment of the transmitter element at block 315.

For example, when the ratio value is a positive value and is more than the predetermined threshold, the processing circuitry may determine that the ratio value does not satisfy the predetermined threshold. As another example, when the ratio value is a negative value and is less than the predetermined threshold, the processing circuitry may determine that the ratio value does not satisfy the predetermined threshold. In some examples, the processing circuitry may generate the alignment indication to indicate that the transmitter element is misaligned to the receiver element. For example, the processing circuitry may generate a warning signal that may caution an operator of the open path gas detecting device on the misalignment of the transmitter element (for example, an electronic message rendered for display on a user interface of a device associated with the operator, an alert sound generated by a speaker element installed in the environment near the operator, and/or the like).

The example method 300 ends at block 317.

Figure 8:
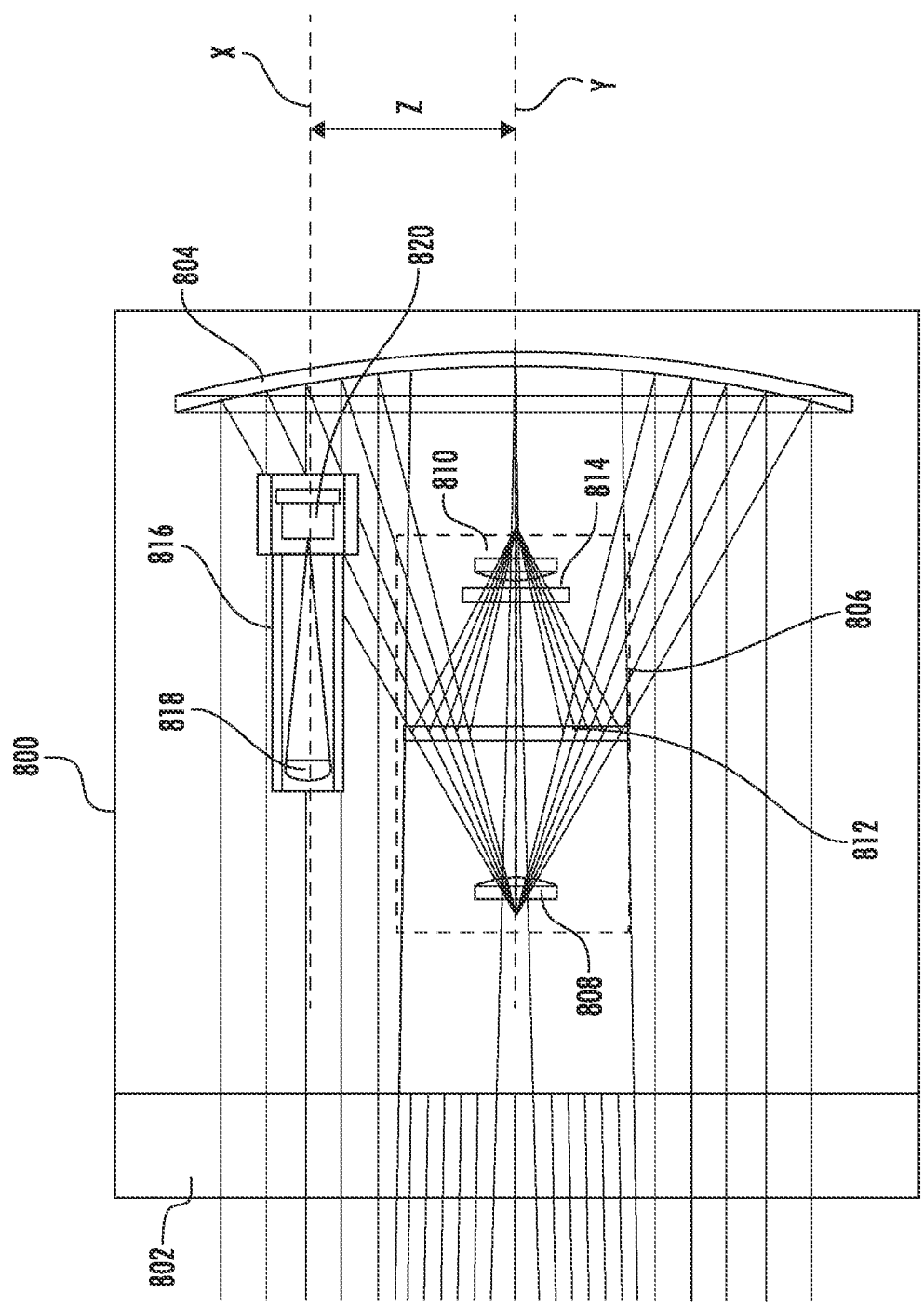
FIG. 8 illustrates an example diagram of an example receiver element in accordance with various examples of the present disclosure.

Referring now to FIG. 8, an example diagram illustrating various components of an example receiver element 800 of an example open path gas detecting device is shown.

As described above, the example receiver element 800 may comprise various components for detecting, measuring, and/or identifying an intensity level of the infrared light received by the receiver element 800. For example, the receiver element 800 may receive infrared light that is generated by an example transmitter element of an example open path gas detecting device, and travelled through the optical path and the window lens component 802 of the receiver element 800. The infrared light may be redirected by a mirror component 804 to a detection channel 806. In some examples, the detection channel 806 may comprise a sample detector component 808 and a reference detector component 810.

In some examples, at least a portion of the infrared light may travel through a sample filter component 812 and arrive at the sample detector component 808. As described above, the target gaseous substance may absorb infrared light, and the sample filter component 812 may filter the infrared light at wavelength(s) and/or wavelength range(s) where the target gaseous substance may absorb the infrared light. Accordingly, the sample detector component 808 may detect the intensity level of infrared light at such wavelength(s) and/or wavelength range(s) where target gaseous substance may absorb the infrared light.

In some examples, at least a portion of the infrared light may travel through a reference filter component 814 and arrive at the reference detector component 810. The reference filter component 814 may filter the infrared light at wavelength(s) and/or wavelength range(s) where the target gaseous substance may not or may be less likely to absorb the infrared light. Accordingly, the reference detector component 810 may detect the intensity level of infrared light at such wavelength(s) and/or wavelength range(s) where target gaseous substance may not or may be less likely to absorb the infrared light.

In some examples, by calculating a difference or ratio value between the intensity level of infrared light detected by the sample detector component 808 and the intensity level of infrared light detected by the reference detector component 810, the example open path gas detecting device may determine the concentration level of target gaseous substance along the optical path. In some examples, the example receiver element 800 may transmit data and/or signal associated with the concentration level of target gaseous substance to a connected control system (for example, to a processing circuitry such as a microcontroller). In some examples, the example receiver element 800 may implement functionality, in some examples, for installation, commissioning, and maintenance of the open path gas detecting device.

In some examples, the sample filter component 812, the sample detector component 808, the reference filter component 814, and the reference detector component 810 may be disposed within the receiver element 800. For example, each of the sample filter component 812, the sample detector component 808, the reference filter component 814, and the reference detector component 810 may be securely positioned with respect an inner surface of the receiver element 800 through one or more supporting beams and/or other supporting structure. In some examples, the sample filter component 812, the sample detector component 808, the reference filter component 814, and the reference detector component 810 may be positioned in a coaxial arrangement with one another, such that, for example, an optical axis Y of the detection channel 806 may pass through the center of the sample filter component 812, the center of the sample detector component 808, the center of the reference filter component 814, and the center of the reference detector component 810.

While the above description illustrates some example components of the detection channel 806, it is noted that the scope of the present disclosure is not limited to these example components only. For example, an example detection channel may additionally or alternatively include other components, and/or various components of the example detection channel may be positioned differently than those shown in FIG. 8.

Similar to those described above in connection with the example transmitter element, it may be necessary to determine if the receiver element is aligned correctly to the transmitter element (i.e. pointing directly at the transmitter element), such that the open path gas detecting device may produce an accurate reading. In some examples, the receiver element may generate a measurement corresponding to the intensity level of the infrared light received by the receiver element, and the measurement may be compared against an predetermined value (for example, an expected intensity level of infrared light if the receiver element is aligned correctly to the transmitter element). Based on the measurement equals to or approximates the predetermined value, it may be determined that the receiver element is aligned correctly to the transmitter element. Based on the ratio between the measurement and the predetermined value exceeding the predetermined threshold, it may be determined that the receiver element is not aligned correctly to the transmitter element.

While the description above provides an example solution to diagnosing misalignment of the receiver element, there are technical challenges when implementing the example solution, similar to those described above in connection with the example transmitter element. For example, the alignment of the transmitter element may also directly influence the received infrared light intensity at the receiver element. It can be technical challenging to differentiate between an alignment error in the transmitter element and an alignment error of the receiver element. As another example, the received infrared light intensity at the receiver element may be affected by the light transmission through window lens component of the receiver element and/or the transmitter element and by light absorption along the optical path. If the receiver element detects, measures, and/or identifies a lower than expected intensity level of infrared light, it can be technical challenging to determine whether the lower than expected intensity level is caused by an alignment error of the receiver element or caused by light absorption due to for example, dirt on the window lens component. Additionally, the design of the receiver element may be optimized such that the receiver element may be insensitive to small errors in alignment. In other words, a significant misalignment of the receiver element may need to occur before any reduction in the intensity level may be detected by the receiver element.

Various examples of the present disclosure may provide example technical solutions for diagnosing misalignment of the receiver element that may overcome the technical challenges discussed above. Referring back to FIG. 8, the example receiver element 800 may comprise a diagnosis channel 816.

In the example shown in FIG. 8, the diagnosis channel 816 may comprise an optical component 818 and a detector component 820. In some examples, the optical component 818 may comprise a silicon lens, which may direct the infrared light to the detector component 820. In some examples, the detector component 820 may be configured to generate a light intensity indication that may indicate the intensity level of the received infrared light. For example, a surface of the detector component 820 may comprise a photodiode active area that may detect, measure, and/or identify intensity level of the infrared light. In some examples, the photodiode active area may comprise indium gallium arsenide (InGaAs).

In some examples, the optical component 818 and the detector component 820 may be disposed within the receiver element 800. For example, each of the optical component 818 and the detector component 820 may be securely positioned with respect an inner surface of the receiver element 800 through one or more supporting beams and/or other supporting structure. In some examples, the optical component 818 and the detector component 820 may be positioned in a coaxial arrangement with one another, such that an optical axis X of the diagnosis channel 816 may pass through the center of the optical component 818 and the center of the detector component 820.

While the above description illustrates some example components of the diagnosis channel 816, it is noted that the scope of the present disclosure is not limited to these example components only. For example, an example diagnosis channel of the present disclosure may additionally or alternatively include other components, and/or various components of the example diagnosis channel may be positioned differently than those shown in FIG. 8.

In some examples, the diagnosis channel 816 may be disposed in a parallel arrangement with the detection channel 806. For example, as shown in FIG. 8, an optical axis X of the diagnosis channel 816 (which may, for example, correspond to the central axis of the optical component 818 and/or the central axis of detector component 820) may be parallel to an optical axis Y of the detection channel 806 (which may, for example, correspond to the central axis of the sample filter component 812, the central axis of the sample detector component 808, the central axis of the reference filter component 814, and/or the central axis of the reference detector component 810).

In some examples, the diagnosis channel 816 may be disposed at an offset distance from the detection channel 806. For example, as shown in FIG. 8, the optical axis X of the diagnosis channel 816 may be at a distance Z from the optical axis Y of the detection channel 806.

In some examples, an effective field of view of the diagnosis channel 816 may be less than an effective field of view of the detection channel 806. For example, the size of the photodiode active area of the detector component 820 of the diagnosis channel 816 may be smaller than the size of the photodiode active area of the reference detector component 810 of the detection channel 806 and/or the size of the photodiode active area of the sample detector component 808 of the detection channel 806. As an example, the photodiode active area of the detector component 820 of the diagnosis channel 816 may have a diameter of 0.3 millimeter, and the photodiode active area of the reference detector component 810 of the detection channel 806 and/or the photodiode active area of the sample detector component 808 of the detection channel 806 may have a diameter of 1.1 millimeters. In some examples, the photodiode active area of the detector component 820, the photodiode active area of the reference detector component 810, and/or the photodiode active area of sample detector component 808 may have other size value(s).

As described above, the diagnosis channel 816 may be arranged parallel to but offset from the detection channel 806, and the diagnosis channel 816 may have an effective field of view smaller than the effective field of view of the detection channel 806. As such, the intensity level of infrared light detected by the diagnosis channel 816 may be different from the intensity level of infrared light detected by the detection channel 806.

In some examples, the ratio between the intensity level of infrared light detected on the diagnosis channel 816 and the intensity level of infrared light detected on the detection channel 806 may be affected by the degree of misalignment of the receiver element 800. For example, the higher the degree of the misalignment of the receiver element 800, the higher the ratio between the intensity level of infrared light detected on the diagnosis channel 816 and the intensity level of infrared light detected on the detection channel 806. In some examples, by comparing the ratio with a predetermined value or a predetermined threshold, misalignment of the receiver element 800 may be detected.

Figure 9:
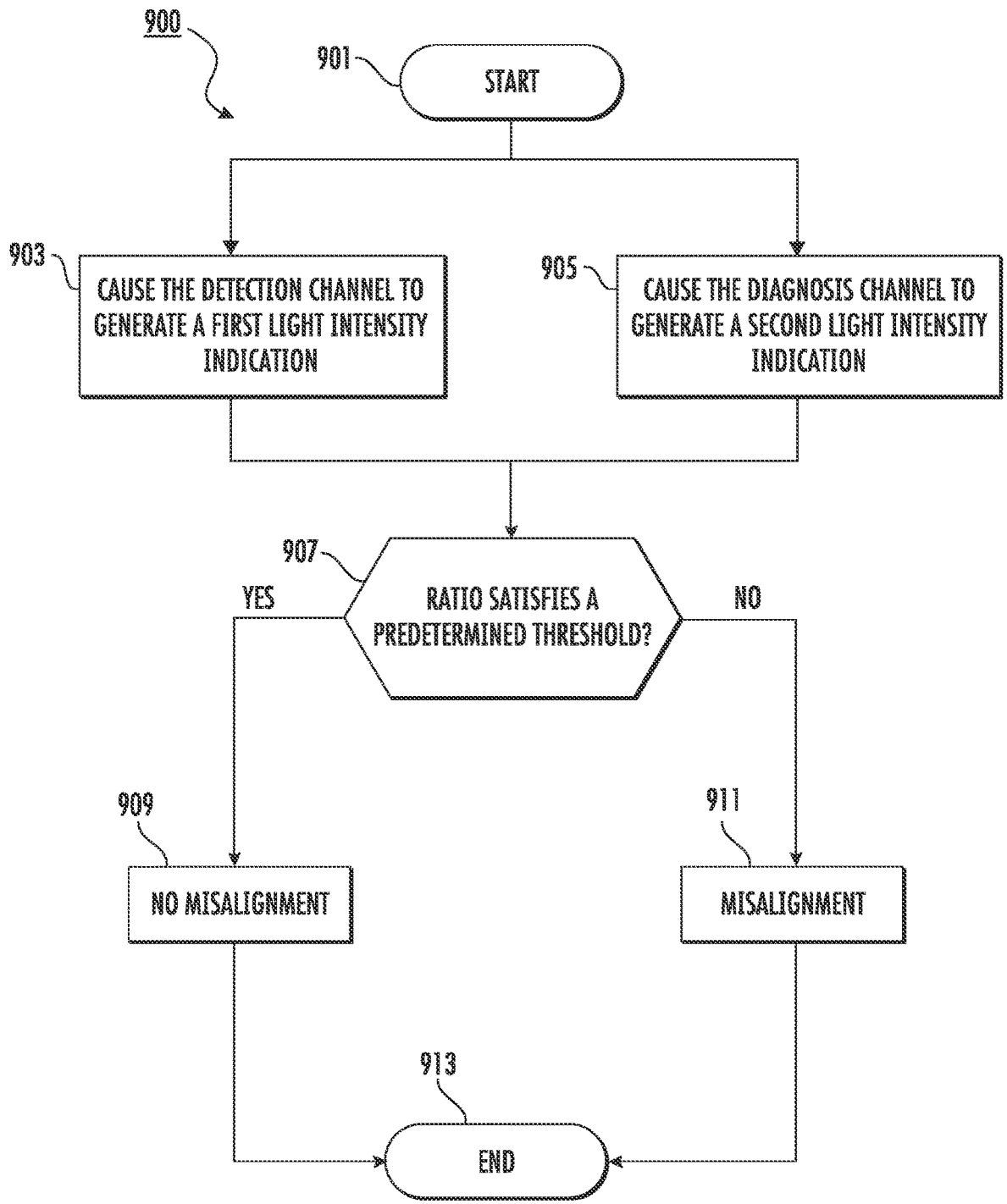
FIG. 9 illustrates an example flowchart for an example method for diagnosing misalignment of an example receiver element in accordance with various examples of the present disclosure.

Referring now to FIG. 9, an example flowchart illustrates an example method 900 in accordance with examples of the present disclosure. In particular, the example method 900 may provide technical solutions for diagnosing misalignment of the receiver element. In some examples, the example method 900 may overcome the technical challenges discussed above.

Similar to those described above in connection with FIG. 3, each block of the flowchart, and combinations of blocks in the flowchart, may be implemented by various means such as hardware, firmware, circuitry and/or other devices associated with execution of software including one or more computer program instructions. Accordingly, examples of the present disclosure may be configured as methods, devices, and the like, and may comprise various means including entirely of hardware or any combination of software and hardware. Furthermore, examples may take the form of a computer program product on at least one non-transitory computer-readable storage medium having computer-readable program instructions (e.g., computer software) embodied in the storage medium.

Referring back to FIG. 9, the example method 900 may start at block 901.

At block 903, a processing circuitry (for example, a microcontroller electronically coupled to a receiver element of an example open path gas detecting device) may cause a detection channel to generate a first light intensity indication.

As described above in connection with FIG. 8, an example receiver element may comprise a detection channel and a diagnosis channel. In some examples, each of the detection channel and the diagnosis channel may be configured to generate a light intensity indication corresponding to infrared light received by the receiver element. For example, the detection channel may comprise a sample detector component and/or a reference detector component, which may be configured to generate a light intensity indication indicating an intensity level of the infrared light received through the detection channel.

At block 905, a processing circuitry (for example, a microcontroller electronically coupled to a receiver element of an example open path gas detecting device) may cause the diagnosis channel to generate a second light intensity indication.

As described above in connection with FIG. 8, the diagnosis channel may comprise a detector component, which may be configured to generate a light intensity indication indicating an intensity level of the infrared light received through the diagnosis channel.

At block 907, a processing circuitry (for example, a microcontroller electronically coupled to a receiver element of an example open path gas detecting device) may determine whether the ratio value between the first light intensity indication and the second light intensity indication satisfies a predetermined value and/or a predetermined threshold.

In some examples, the predetermined value and/or the predetermined threshold may be determined or calculated when the receiver element is correctly aligned to the transmitter element. For example, during the initial installation of the receiver element, the processing circuitry may determine the predetermined value and/or the predetermined threshold. Additionally, or alternatively, the predetermined value and/or the predetermined threshold may be determined based on, for example but not limited to, a system requirement that may corresponds to a system toleration of the misalignment of the receiver element.

If, at block 907, the processing circuitry determines that the ratio value satisfies the predetermined threshold, the processing circuitry may determine that there is no misalignment of the receiver element at block 909.

For example, when the ratio value is a positive value and is less than the predetermined threshold, the processing circuitry may determine that the ratio value satisfies the predetermined threshold. As another example, when the ratio value is a negative value and is more than the predetermined threshold, the processing circuitry may determine that the ratio value satisfies the predetermined threshold. In some examples, the processing circuitry may generate the alignment indication to indicate that the receiver element is not misaligned to the transmitter element.

If, at block 907, the processing circuitry determines that the ratio value does not satisfies the predetermined threshold, the processing circuitry may determine that there is misalignment of the transmitter element at block 911.

For example, when the ratio value is a positive value and is more than the predetermined threshold, the processing circuitry may determine that the ratio value does not satisfy the predetermined threshold. As another example, when the ratio value is a negative value and is less than the predetermined threshold, the processing circuitry may determine that the ratio value does not satisfy the predetermined threshold. In some examples, the processing circuitry may generate the alignment indication to indicate that the receiver element is misaligned to the transmitter element. For example, the processing circuitry may generate a warning signal that may caution an operator of the open path gas detecting device on the misalignment of the receiver element (for example, an electronic message rendered for display on a user interface of a device associated with the operator, an alert sound generated by a speaker element installed in the environment near the operator, and/or the like).

The example method 900 may end at block 913.

As described above, various examples of the present disclosure may generate one or more alignment indications that may indicate whether the transmitter element or the receiver element is correctly aligned. Such alignment indications may be generated by a microcontroller in accordance with examples of the present disclosure, which may facilitate an improvement in diagnostic capability, enable each misalignment condition to be differentiated, and direct the operator to take appropriate action.

For example, the microcontroller may generate an alignment indication that may indicate the transmitter element is misaligned based on, for example, those described above in connection with FIG. 2 to FIG. 7. As an example, the microcontroller may calculate a ratio value between the first light intensity indication (derived from the first discharge energy level) and the second light intensity indication (derived from the second discharge energy level). Based on determining that the ratio value exceeds a predetermined threshold, the microcontroller may generate an alignment indication indicating that the transmitter element is misaligned.

As another example, the microcontroller may generate an alignment indication that may indicate the receiver element is misaligned based on, for example, those described above in connection with FIG. 8 to FIG. 9. As an example, the microcontroller may calculate a ratio value between the first light intensity indication (derived from the detection channel) and the second light intensity indication (derived from the diagnosis channel). Based on determining that the ratio value exceeds a predetermined threshold, the microcontroller may generate an alignment indication indicating that the receiver element is misaligned.

While the description above illustrates example indications that may be generated in accordance with examples of the present disclosure, it is noted that the scope of the present disclosure is not limited to these examples only. In some examples, other indications may be additionally or alternatively generated.

For example, the microcontroller may generate an indication that may indicate whether there is obstruction of infrared light along the optical path. As described above in connection with FIG. 8, the effective field of view of the diagnosis channel may be smaller than the effective field of view of the detection channel, and the diagnosis channel may be in a parallel arrangement but offset from the detection channel. In some examples, the detection channel may detect a reduction in intensity level of infrared light, while the diagnosis channel may detect a disproportional change in the intensity level of infrared light (for example, the intensity level of infrared light may have a minimal change or a complete loss), the microcontroller may determine that there is at least partial obscuration of infrared light along the optical path (for example, an object moving along the optical path and blocking the infrared light, buildup of dust or dirt on window lens components). Accordingly, the microcontroller may generate an indication indicating that there is obstruction of infrared light along the optical path.

It is to be understood that the disclosure is not to be limited to the specific examples disclosed, and that modifications and other examples are intended to be included within the scope of the appended claims. Although specific terms are employed herein, they are used in a generic and descriptive sense only and not for purposes of limitation, unless described otherwise.

The invention claimed is:

1. A gas detecting device comprising a microcontroller electronically coupled to a receiver element and configured to:
   generate an alignment indication based at least in part on a first light intensity indication generated by a detection channel of the receiver element and a second light intensity indication generated by a diagnosis channel of the receiver element, wherein the alignment indication indicates whether the receiver element is misaligned.

2. The gas detecting device of claim 1, wherein the detection channel is in a parallel arrangement with the diagnosis channel.

3. The gas detecting device of claim 2, wherein the diagnosis channel has smaller optical aperture when compared to the detection channel.

4. The gas detecting device of claim 2, wherein the detection channel has larger field of view.

5. The gas detecting device of claim 2, wherein the diagnosis channel has smaller field of view.

6. The gas detecting device of claim 1, wherein the microcontroller is further configured to:
   calculate a ratio value based on the first light intensity indication and the second light intensity indication; and determine whether the ratio value satisfies a predetermined threshold.

7. The gas detecting device of claim 6, wherein the microcontroller is further configured to:
in response to determining that the ratio value satisfies the predetermined threshold, generate the alignment indication to indicate that the receiver element is not misaligned.

8. A method comprising:
causing a detection channel and a diagnosis channel to generate a light intensity indication corresponding to light received by the receiver element; and
generating an alignment indication based at least in part on a first light intensity indication generated by the detection channel and a second light intensity indication generated by the diagnosis channel, wherein the alignment indication indicates whether the receiver element is misaligned.

9. The method of claim 8, wherein determining whether a ratio value between the first light intensity indication and the second light intensity indication satisfies a predetermined value and/or a predetermined threshold.

10. The method of claim 9, wherein the predetermined value and/or the predetermined threshold may be determined or calculated when the receiver element is correctly aligned to a transmitter element.

11. The method of claim 9, wherein the predetermined value and/or the predetermined threshold may be determined based on a system requirement that may corresponds to a system toleration of the misalignment of the receiver element.

12. The method of claim 8, further comprising:
calculating a ratio value based on the first light intensity indication and the second light intensity indication; and
determining whether the ratio value satisfies a predetermined threshold.

13. The method of claim 12, further comprising:
in response to determining that the ratio value satisfies the predetermined threshold, generating the alignment indication to indicate that the receiver element is not misaligned to a transmitter element.

14. The method of claim 12, further comprising:
in response to determining that the ratio value does not satisfy the predetermined threshold, generating the alignment indication to indicate that the receiver element is misaligned to a transmitter element.

15. A system for gas detection, comprising:
a receiver element comprising a detection channel and a diagnosis channel, wherein each of the detection channel and the diagnosis channel is configured to generate a light intensity indication corresponding to light received by the receiver element; and
a microcontroller electronically coupled to the receiver element and configured to:
generate an alignment indication based at least in part on a first light intensity indication generated by the detection channel and a second light intensity indication generated by the diagnosis channel, wherein the alignment indication indicates whether the receiver element is misaligned.

16. The system for gas detection of claim 15, wherein the detection channel is in a parallel arrangement with the diagnosis channel.

17. The system for gas detection of claim 16, wherein the diagnosis channel has smaller optical aperture when compared to the detection channel.

18. The system for gas detection of claim 16, wherein the detection channel has larger field of view.

19. The system for gas detection of claim 16, wherein the diagnosis channel has smaller field of view.

20. The system for gas detection of claim 15, wherein the microcontroller is further configured to:
calculate a ratio value based on the first light intensity indication and the second light intensity indication; and
determine whether the ratio value satisfies a predetermined threshold.

\* \* \* \* \*